United States Patent
Pedersen

(10) Patent No.: US 11,436,382 B2
(45) Date of Patent: *Sep. 6, 2022

(54) SYSTEMS AND METHODS FOR DETECTING AND MITIGATING PROGRAMMABLE LOGIC DEVICE TAMPERING

(71) Applicant: Altera Corporation, San Jose, CA (US)

(72) Inventor: Bruce B. Pedersen, Sunnyvale, CA (US)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/794,003

(22) Filed: Feb. 18, 2020

(65) Prior Publication Data

US 2020/0184118 A1 Jun. 11, 2020

Related U.S. Application Data

(63) Continuation of application No. 15/799,690, filed on Oct. 31, 2017, now Pat. No. 10,592,699, which is a
(Continued)

(51) Int. Cl.
*G08B 21/00* (2006.01)
*G06F 21/86* (2013.01)
(Continued)

(52) U.S. Cl.
CPC ............. *G06F 21/86* (2013.01); *G06F 21/76* (2013.01); *H03K 19/17768* (2013.01)

(58) Field of Classification Search
CPC .......... G06F 21/76; G06F 21/86; G06F 21/88; H04L 9/002–9/006; H03K 19/17768
(Continued)

(56) References Cited

U.S. PATENT DOCUMENTS

| | | |
|---|---|---|
| 4,455,602 A | 6/1984 | Baxter et al. |
| 4,609,986 A | 9/1986 | Hartmann et al. |

(Continued)

FOREIGN PATENT DOCUMENTS

EP 1659515 5/2006

OTHER PUBLICATIONS

Harper et al, A Security Policy Based Upon Hardware Encryption, IEEE, Jan. 1, 2004, pp. 1-8. (Year: 2004).*
(Continued)

*Primary Examiner* — Luu T Pham
*Assistant Examiner* — Jenise E Jackson
(74) *Attorney, Agent, or Firm* — Fletcher Yoder, P.C.

(57) ABSTRACT

Systems and methods are disclosed for preventing tampering of a programmable integrated circuit device. Generally, programmable devices, such as FPGAs, have two stages of operation; a configuration stage and a user mode stage. To prevent tampering and/or reverse engineering of a programmable device, various anti-tampering techniques may be employed during either stage of operation to disable the device and/or erase sensitive information stored on the device once tampering is suspected. One type of tampering involves bombarding the device with a number of false configuration attempts in order to decipher encrypted data. By utilizing a dirty bit and a sticky error counter, the device can keep track of the number of failed configuration attempts that have occurred and initiate anti-tampering operations when tampering is suspected while the device is still in the configuration stage of operation.

18 Claims, 4 Drawing Sheets

Related U.S. Application Data continuation of application No. 14/218,455, filed on Mar. 18, 2014, now Pat. No. 9,852,315, which is a continuation of application No. 13/098,074, filed on Apr. 29, 2011, now Pat. No. 8,719,957.

(51) Int. Cl.
*G06F 21/76* (2013.01)
*H03K 19/17768* (2020.01)

(58) Field of Classification Search
USPC .......................................................... 726/34
See application file for complete search history.

(56) References Cited

U.S. PATENT DOCUMENTS

| | | |
|---|---|---|
| 4,617,479 A | 10/1986 | Hartmann et al. |
| 4,677,318 A | 6/1987 | Veenstra |
| 4,713,792 A | 12/1987 | Hartmann et al. |
| 4,774,421 A | 9/1988 | Hartmann et al. |
| 4,871,930 A | 10/1989 | Wong et al. |
| 4,899,067 A | 2/1990 | So et al. |
| 4,912,342 A | 3/1990 | Wong et al. |
| 5,033,084 A | 7/1991 | Beecher |
| 5,081,675 A | 1/1992 | Kittirutsunetorn |
| 5,121,006 A | 6/1992 | Pedersen |
| 5,220,214 A | 6/1993 | Pedersen |
| 5,260,610 A | 11/1993 | Pedersen et al. |
| 5,260,611 A | 11/1993 | Cliff et al. |
| 5,350,954 A | 9/1994 | Patel |
| 5,371,422 A | 12/1994 | Patel et al. |
| 5,388,157 A | 2/1995 | Austin |
| 5,406,627 A | 4/1995 | Thompson et al. |
| 5,450,022 A | 9/1995 | New |
| 5,479,512 A | 12/1995 | Weiss |
| 5,513,262 A | 4/1996 | van Rumpt et al. |
| 5,548,228 A | 8/1996 | Madurawe |
| 5,563,592 A | 10/1996 | Cliff et al. |
| 5,581,198 A | 12/1996 | Trimberger |
| 5,581,202 A | 12/1996 | Yano et al. |
| 5,636,281 A | 6/1997 | Antonini |
| 5,768,372 A | 6/1998 | Sung et al. |
| 5,915,017 A | 6/1999 | Sung et al. |
| 6,118,869 A * | 9/2000 | Kelem ...................... G11C 7/24 380/44 |
| 6,181,164 B1 | 1/2001 | Miller |
| 6,263,398 B1 | 7/2001 | Taylor et al. |
| 6,289,459 B1 | 9/2001 | Fischer et al. |
| 6,314,550 B1 | 11/2001 | Wang et al. |
| 6,331,784 B1 | 12/2001 | Mason et al. |
| 6,651,155 B1 | 11/2003 | Bocchino et al. |
| 6,980,649 B1 | 12/2005 | Batcher |
| 7,143,295 B1 | 11/2006 | Trimberger |
| 7,218,567 B1 | 5/2007 | Trimberger et al. |
| 7,236,007 B1 | 6/2007 | Chang |
| 7,254,800 B1 * | 8/2007 | Trimberger ............. G06F 30/34 716/117 |
| 7,330,979 B1 | 2/2008 | Hazard |
| 7,345,502 B1 | 3/2008 | Lakkapragada et al. |
| 7,368,935 B2 | 5/2008 | Bernier et al. |
| 7,490,311 B1 | 2/2009 | Payette |
| 7,607,025 B1 | 10/2009 | Trimberger |
| 7,702,977 B1 | 4/2010 | Tang et al. |
| 7,739,565 B1 | 6/2010 | Lesea |
| 7,757,295 B1 * | 7/2010 | Hadaaegh ............. G06F 21/552 726/26 |
| 7,759,968 B1 | 7/2010 | Hussein et al. |
| 7,952,387 B1 | 5/2011 | Frazer |
| 8,355,502 B1 | 1/2013 | Donlin et al. |
| 8,479,069 B2 | 7/2013 | Miller et al. |
| 8,576,641 B1 * | 11/2013 | Trimberger ............. G11C 7/22 365/189.15 |
| 8,736,299 B1 | 5/2014 | Pedersen |
| 2002/0002683 A1 * | 1/2002 | Benson .................... G06F 21/87 713/194 |
| 2002/0143410 A1 * | 10/2002 | Yance .................... G06F 1/3237 700/11 |
| 2005/0120358 A1 | 6/2005 | Nikami et al. |
| 2005/0166040 A1 | 7/2005 | Walmsley |
| 2005/0177633 A1 | 8/2005 | Plunkett |
| 2006/0052962 A1 | 3/2006 | Shipton et al. |
| 2007/0094420 A1 | 4/2007 | Holm et al. |
| 2007/0175023 A1 * | 8/2007 | Heitmann ............. H01L 23/576 29/832 |
| 2007/0296403 A1 | 12/2007 | Mori et al. |
| 2008/0094896 A1 | 4/2008 | Erickson et al. |
| 2008/0270805 A1 | 10/2008 | Kean |
| 2009/0113220 A1 | 4/2009 | Lee et al. |
| 2009/0164727 A1 | 6/2009 | Penton et al. |
| 2009/0189702 A1 | 7/2009 | Berthold et al. |
| 2009/0294524 A1 | 12/2009 | Rice et al. |
| 2010/0213951 A1 | 8/2010 | Lewis |
| 2011/0029830 A1 | 2/2011 | Miller et al. |
| 2011/0078379 A1 | 3/2011 | Iida et al. |
| 2012/0131673 A1 | 5/2012 | Caci |
| 2012/0274350 A1 | 11/2012 | Reese et al. |
| 2015/0234008 A1 | 8/2015 | Miller et al. |
| 2017/0373844 A1 * | 12/2017 | Sykora .................. H04L 9/0877 |

OTHER PUBLICATIONS

Roy et al, Protecting Bus-based Hardware IP by Secret Sharing, IEEE, Jun. 1, 2008, pp. 846-851. (Year: 2008).*

Vaze, A Large-System Analysis of the Imperfect-CSIT Gaussian Broadcast Channel With a DPC-based Transmission Strategy, IEEE, 2010, pp. 1-5.

Yang et al., Timing Ultra-Wideband Signals With Dirty Templates, Nov. 2005, IEEE, vol. 53, No. 11.

Aghamirzaie et al., "Reduction of Process Variation Effect onFPGAs Using Multiple Configuration," IEEE, Sep. 2010, pp. 85-90.

Singh et al., "The Case for Registered Routing Switches in Field Programmable Gate Arrays," ACM, Feb. 13, 2001, pp. 161-169.

Altera, "Operating Requirements for Altera Devices," Data Sheet, Version 9.02, Dec. 1999, pp. 1-14.

Minnick, R.C., "A Survey of Microcellular Research," Journal of the Association for Computing Machinery, vol. 14, No. 2, pp. 203-241 (Apr. 1967).

Mukhopadhyay, A., Recent Developments in Switching Theory. Academic Press, New York, Chapters VI and IX, pp. 229-254 and 369-422 (1971 ).

Plummer, James D. et al., "Silicon VLSI Technology: Fundamentals, Practice and Modeling," Prentice Hall, Upper Saddle River, New Jersey, 2000, pp. 466-468.

Wahlstrom, S.E., "Programmable logic arrays-cheaper by the millions," Electronics, pp. 90-95 (Dec. 11, 1967).

* cited by examiner

SYSTEMS AND METHODS FOR DETECTING AND MITIGATING PROGRAMMABLE LOGIC DEVICE TAMPERING

This is a continuation of U.S. patent application Ser. No. 15/799,690, filed Oct. 31, 2017, and entitled "Systems and Methods for Detecting and Mitigating of Programmable Logic Device Tampering," which is a continuation of U.S. patent application Ser. No. 14/218,455, filed Mar. 18, 2014, and entitled "Systems and Methods for Detecting and Mitigating Programmable Logic Device Tampering," now U.S. Pat. No. 9,852,315, which is a continuation of U.S. patent application Ser. No. 13/098,074, filed Apr. 29, 2011, and entitled "Systems and Methods for Detecting and Mitigating Programmable Logic Device Tampering," now U.S. Pat. No. 8,719,957, the entirety of which are incorporated by reference for all purposes.

FIELD OF INVENTION

This disclosure relates to systems and methods for securing the programming data of programmable device—e.g., a field-programmable gate array (FPGA) or other programmable logic device (PLD)—against copying and other tampering.

BACKGROUND OF THE DISCLOSURE

Programmable devices are well known. In one class of known PLDs, each device has a large number of logic gates, and a user programs the device to assume a particular configuration of those logic gates, frequently using a software tool provided by the manufacturer of the device, with the software tool being executed on a computer having an adapter into which the device is inserted.

In many instances, users have an interest in preventing their competitors from determining their particular logic gate configurations. Earlier systems addressed this concern by implementing various security measures, such as encryption algorithms. Commonly-assigned U.S. Pat. Nos. 5,768,372 and 5,915,017, each of which is hereby incorporated by reference herein in its respective entirety, describe the encryption of the configuration data stored in the nonvolatile storage and its decryption upon loading into the programmable device. However, some encryption keys can be deciphered by bombarding the device with false configuration data and analyzing the device's response to the false data. It is particularly difficult to secure against this type of attack because it is performed before the device enters the user-mode, where many security algorithms are implemented.

SUMMARY OF THE DISCLOSURE

To prevent attacks similar to the one described above, the present disclosure relates to systems and methods for mitigating tampering of a programmable integrated circuit device. In particular, dirty bits and sticky error counters can be employed to determine how many unsuccessful device configurations have been attempted. Multiple unsuccessful configuration attempts can indicate that an attack is taking place, and as such, anti-tampering techniques can be activated to secure sensitive data on the device when multiple unsuccessful configuration attempts are detected.

In accordance with embodiments of the present disclosure, there is provided a programmable integrated circuit device having a register, a control block, and logic circuitry. The register is configured to store a dirty bit. The control block is configured to configure the programmable integrated circuit device. Before beginning a given configuration attempt, the control block determines the status of the dirty bit. If the dirty bit is not set, the control block will set it at the beginning of the given configuration attempt.

In accordance with additional embodiments of the present disclosure, when the control block determines that the dirty bit is set prior to beginning the given configuration attempt, the control block can issue an alarm that indicates, for example, that it is suspected that the device is being tampered with. In some embodiments, the control block initiates anti-tampering operations when the dirty bit is determined to be set before beginning the configuration attempt. The anti-tampering operations can include, for example, clearing a key stored in the programmable integrated circuit device and/or killing the programmable integrated circuit device.

In accordance with additional embodiments of the present disclosure, a programmable integrated circuit device includes a register that is configured to store a value of an error counter. After a configuration attempt fails to complete successfully, control block will modify the value of the error counter. The control block then determines whether the value of the error counter has reached a first threshold. If it has, the control block will initiate an anti-tampering operation. In some embodiments, multiple thresholds may be configured such that different anti-tampering operations may be initiated as the number of failed configuration attempts accumulate.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
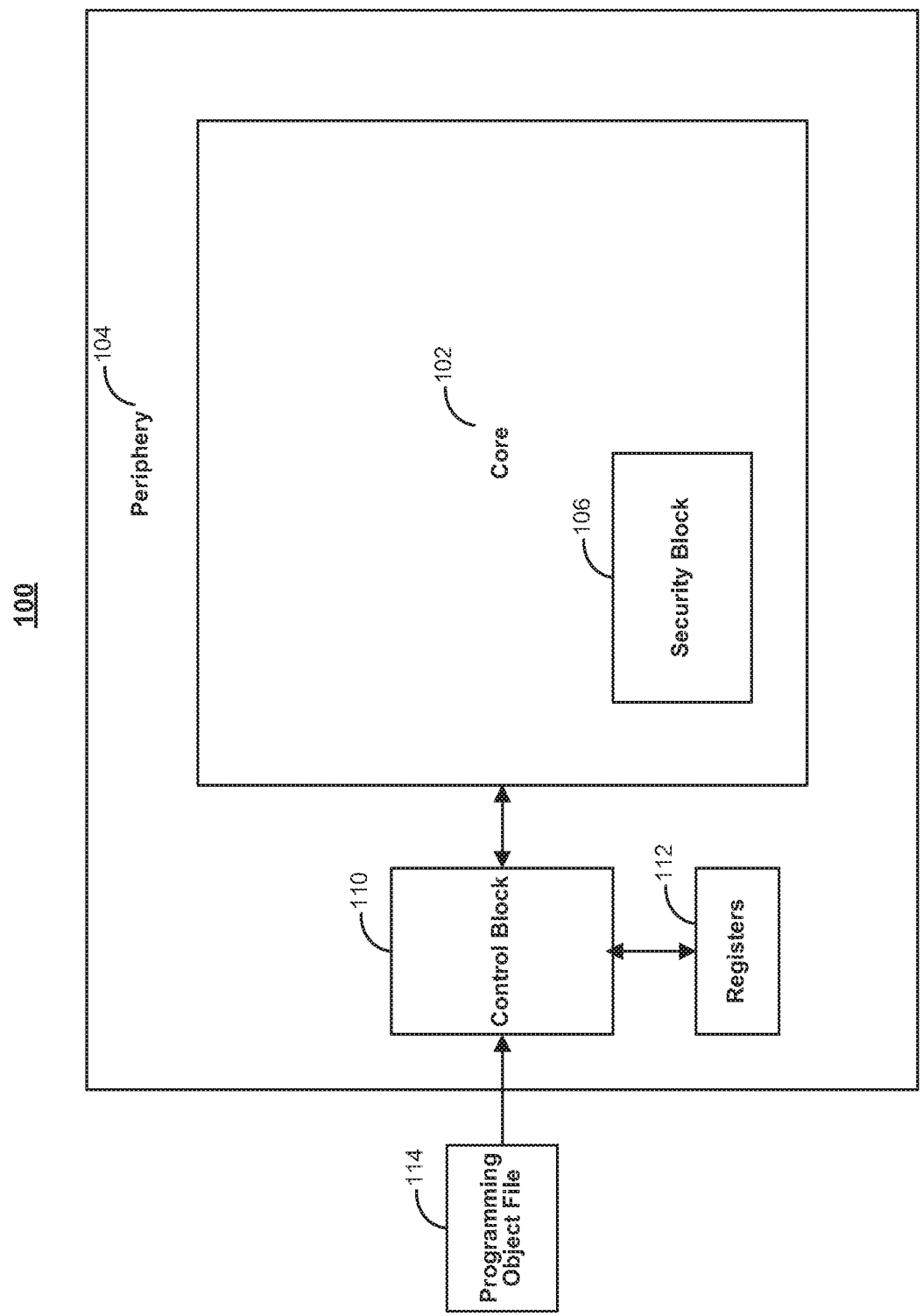
FIG. 1 is a block diagram of a logic device, according to an illustrative embodiment.

Generally, programmable devices, such as FPGAs, have two stages of operation; a configuration stage and a user mode stage. The configuration stage may include various operations that lead up to the user mode stage, for example, initialization, configuration, and startup operations. The user mode stage generally refers to a stage of operation after a device's configuration has successfully completed where the device is generally operating based on the logic circuitry that was configured during the configuration stage.

To prevent tampering of a programmable device, various anti-tampering techniques may be employed during either stage of operation to disable the device and/or erase sensitive information stored on the device once tampering is suspected. Systems and methods are described herein for employing an exemplary anti-tampering technique during the configuration stage of operation that utilizes a dirty bit and a sticky error counter.

The term "sticky bit" as used herein refers to a volatile or nonvolatile bit or series of bits that may be used to configure, control, and/or activate various security measures. One type of sticky bit, a "dirty bit," provides an indication of whether an unsuccessful attempt to configure a device has been previously made, which in turn, can indicate that someone may be attempting to tamper with the device.

As an example, one type of attack a tamperer may implement is an attack that bombards a device with programming object files (POFs) that include false configuration data (e.g., configuration data that would not pass cyclic redundancy check (CRC) after being decrypted). By analyzing the data that the device returns after receiving the false configuration data, the tamperer may be able to determine the value of an encryption key and then, using the determined encryption key, gain access to sensitive information stored on the device. This form of attack would occur while the device is in its configuration stage of operation and before the device enters the user mode stage where certain types of anti-tampering operations may be employed. It should be noted that any example that refers to an encryption key is for illustrative purposes and may equally apply to a decryption key or any sensitive information stored therein without departing from the scope of the disclosure.

The dirty bit and sticky error counter can be used to determine how many unsuccessful attempts to configure the device have occurred because of the bombardment of POFs containing false configuration data. Once a predetermined number of unsuccessful configuration attempts have been detected, the anti-tampering security measures configured by the sticky bits may be activated while still in the configuration stage to thwart the attack. For example, the security measures configured by the sticky bits may initiate device kill sequences and/or clear the encryption keys stored in the device under certain situations. Further details regarding kill sequences and encryption key clearing are discussed in copending, commonly-assigned U.S. patent application Ser. No. 13/097,816, issued as U.S. Pat. No. 8,461,863, which is hereby incorporated by reference herein in its entirety.

FIG. 1 shows an illustrative block diagram of logic device 100 which may be subject to attacks by the tamperer described above. Device 100 includes core 102 and periphery 104. Core 102 includes programmable logic circuitry that can be configured according to configuration data that is programmed by a user. For example, core 102 can be configured to handle a particular type of digital signal processing algorithm or any other suitable operation as programmed by a user. Core 102 may also include security block 106, which can handle various anti-tampering operations of device 100. For example, security block 106 may employ anti-tampering techniques for device 100 once device 100 has entered the user mode stage. In one embodiment, device 100 is an FPGA; however, device 100 maybe any other suitable form of a circuitry. For example, device 100 may be an application-specific integrated circuit (ASIC) or any suitable programmable logic device.

In some embodiments, periphery 104 includes control block 110 and registers 112. Control block 110 generally controls the configuration of core 102 and may handle various other tasks associated with the configuration of core 102, such as, encryption, decryption, compression, decompression, and/or any other suitable function. Registers 112 may include various types of volatile and nonvolatile registers for storing, for example, encryption keys and/or sticky bits which relate to security option information and/or security option configurations. Various embodiments of registers 112 will be discussed in greater detail below with regard to FIG. 2.

In some embodiments, control block 110 receives programming object file (POF) 114. POF 114 includes configuration data from a user or manufacturer that may be used to configure core 102 and/or various security options (e.g., anti-tampering security options), such as those stored in registers 112 or in security block 106. In some embodiments, POF 114 can be configured such that it cannot be used to configure device 100 unless a specified security option is activated. As a specific example, POF 114 may not be used to program the logic circuitry of core 102 unless device 100 includes a fused dirty bit in registers 112 that activates a specific anti-tampering security option. Fused dirty bits will be discussed in greater detail below with regard to FIG. 2.

Figure 2:
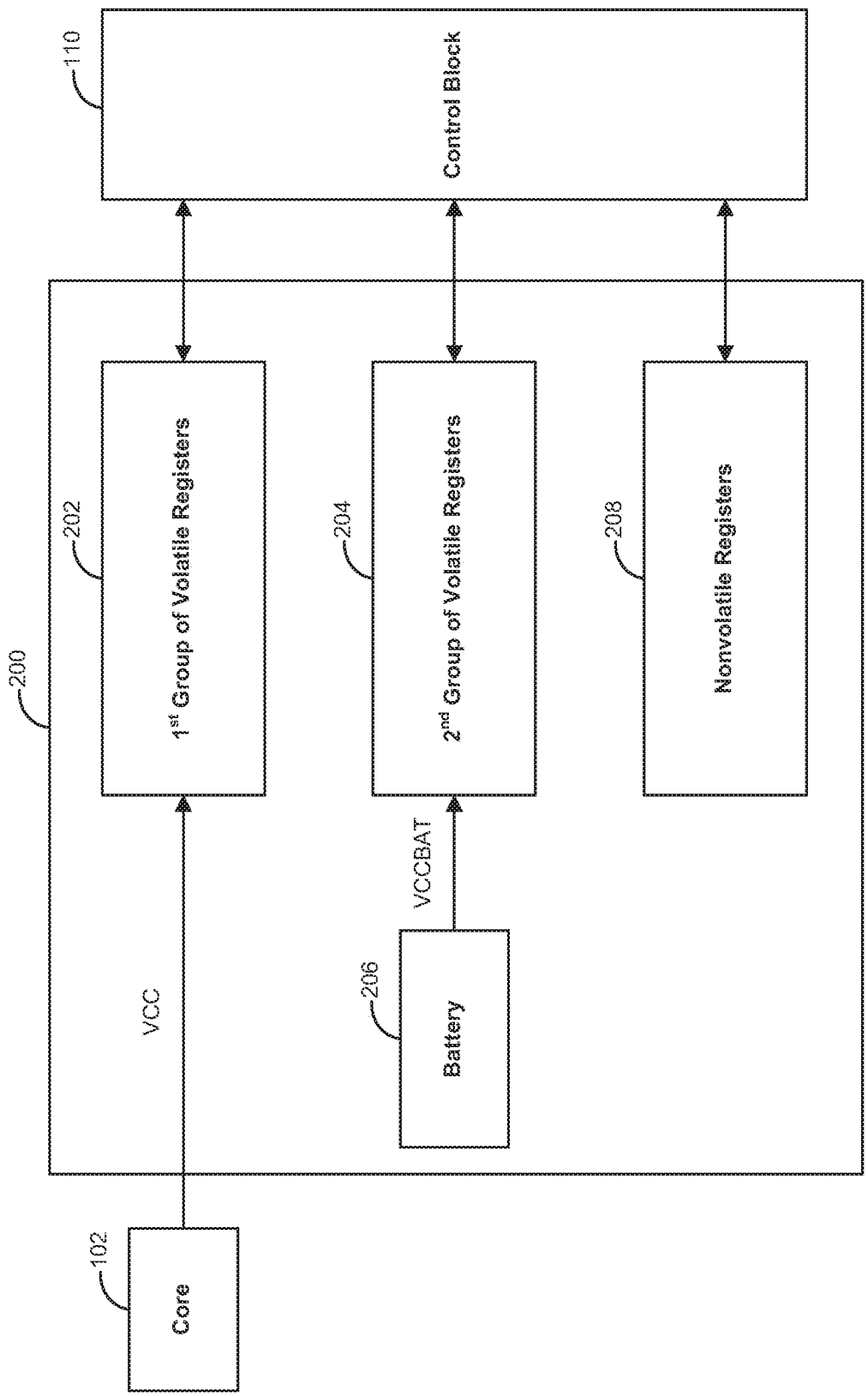
FIG. 2 is a block diagram of registers, according to an illustrative embodiment.

FIG. 2 shows illustrative registers 200, which may be substantially similar to registers 112 of FIG. 1. Registers 200 may include first group of volatile registers 202, second group of volatile registers 204, battery 206, and nonvolatile registers 208.

In some embodiments, first group of volatile registers 202, second group of volatile registers 204, and/or nonvolatile registers 208 may be used to store an encryption key that is used by control block 110 to decrypt and/or encrypt, for example, the configuration data in PCF 114 of FIG. 1. In some embodiments, the encryption key is based on the advanced encryption standard (AES). Further details regarding various embodiments of encryption keys and their use in encryption and decryption are discussed in greater detail in commonly-assigned U.S. patent application Ser. No. 13/097, 205, issued as U.S. Pat. No. 8,627,105, and Ser. No. 13/098, 315, issued as U.S. Pat. No. 9,331,848, which are hereby incorporated by reference herein in their respective entireties.

In some embodiments, first group of volatile registers 202, second group of volatile registers 204, and/or nonvolatile registers 208 may be used to store the sticky bits. As noted above, sticky bits may be used to configure, control, and/or activate various anti-tampering security measures.

First group of volatile registers 202 and second group of volatile registers 204 may be implemented using any suitable volatile storage technology. As illustrated by FIG. 2, first group of volatile registers 202 may be powered by the same power supply as core 102 (not shown) and/or receives power from core 102 as illustrated by VCC and second group of volatile registers 204 may be powered by battery 206 as illustrated by VCCBAT. In some embodiments, second group of volatile registers 204 receives power via VCC in addition to power from VCCBAT (not shown). In such an embodiment, both power supplies would need to be removed from second group of registers to clear any data stored in second group of volatile registers 204, as opposed to just removing VCCBAT. Battery 206 may be any suitable type of battery. The sticky bits stored in second group of volatile registers 204 may be referred to herein as battery-backed sticky bits because they receive power from battery 206 and maintain their value when battery 206 is on even when the core voltage, VCC is removed (e.g., when device 100 is turned off).

Nonvolatile registers 208 may be implemented using any suitable nonvolatile storage technology. For example, nonvolatile registers 208 may be implemented using erasable and programmable nonvolatile technology, such as an EEPROM. In such an embodiment, the data stored in nonvolatile registers can be erased and/or reprogrammed by control block 110. In some embodiments, nonvolatile registers 208 may be implemented using one-time-programmable nonvolatile technology, such as fuses. In such an embodiment, the fuses create an open circuit when broken and cannot be refused once broken, which can render device 100 indefinitely inoperable.

In some embodiments, different sticky bits or sticky bit patterns may be associated with different anti-tampering security measures. For example, if a particular sticky bit or pattern of sticky bits is set, then a particular anti-tamper option will be activated. One specific example of an anti-tampering option is disabling an FPGA's JTAG ports. In some embodiments, the sticky bits and various security option bits are set and/or cleared by a PGF, by control block 110, and/or by a manufacturer (e.g., a manufacturer may set fuses in nonvolatile registers 208 during production). In some embodiments, the sticky bits may only be accessed from core 102. As such, one would have to enter the user mode stage before manipulating the values of the sticky bits, dirty bits, and/or sticky error counters. Further details regarding the configuration of the sticky bits as well as various anti-tamper options and operations are discussed in copending, commonly-assigned U.S. patent application Ser. No. 13/097,816 and commonly-assigned U.S. patent application Ser. No. 13/098,316, issued as U.S. Pat. No. 8,736,299, which are hereby incorporated by reference herein in their respective entireties.

In one embodiment, registers 200 is located in periphery 104 of FIG. 1; however, in some embodiments, registers 200 may be placed in core 102 in addition to, or instead of, being placed in periphery 104. In some embodiments, the sticky bits in registers 200 may be accessed by control block 110 and/or core 102.

In one embodiment, the sticky bits are implemented redundantly in triplicate sticky bit groups and backed up using a shadow register that is powered by logic in core 102. For example, identical sticky bit patterns may be stored in each of first group of volatile registers 202, second group of volatile registers 204, nonvolatile registers 20'3, and in registers in core 102.

In some embodiments, the redundant sticky bit groups are configured such that if one sticky bit in one group is set, the corresponding sticky bit will automatically be set in the other sticky bit groups. In this embodiment, if power is removed from one or two of the sticky bit groups stored in volatile registers, they will regain the appropriate settings when power is reapplied to the respective volatile registers based on the settings stored in the nonvolatile registers. In some embodiments, a sticky bit can be cleared by cycling both power supplies at the same time. For example, if the sticky bit is only stored in first group of volatile registers 202, second group of volatile registers 204, the sticky bit will be cleared when both VCC and VCCBAT power supplies are removed from the registers. If the tamperer powers the device down completely (e.g., remove both VCC and VCCBAT power supplies), the sticky bit configurations may be lost, but so will the encryption keys and possibly the configuration data that the tamperer aims to extract. As such, the redundant sticky bit groups prevents an attacker from removing the anti-tampering security options that are configured using the sticky bits when nonvolatile registers are used and prevents an attacker from accessing the encryption keys and configuration data when only volatile registers are used.

In some embodiments, control block 110 of FIG. 1 controls the redundant configuration of the sticky bits between the different sticky bit groups. For example, control block 110 may be configured to detect when one of the sticky it groups loses and regains power, and then, provide that sticky bit group with the appropriate sticky bit pattern when the sticky bit group regains power. In some embodiments, the redundant configuration is hardwired in device 100 of FIG. 1 such that the sticky bits automatically synchronize.

As noted above, a dirty bit, which is a type of sticky bit, can be utilized to determine whether there has been an unsuccessful attempt to configure device 100 and a sticky error counter may be used to determine how many unsuccessful attempts to configure device 100 have occurred. For example, the dirty bit is configured to be set (e.g., equal to a value of 1) at the beginning of the configuration stage and further configured to be cleared (e.g., equal to a value of 0) by a user's configuration of core 102 once device 100 enters the user mode stage or by control block 110 after an encrypted POF successfully configures the device (e.g., a cyclic redundancy check of the POF passes). However, if an attempt to configure device 100 is unsuccessful or a POF contains false configuration data and does not pass a CRC, the dirty bit will not be cleared. The next time a configuration attempt is made, control block 110 will determine that the dirty bit is already set and take appropriate action, which may include, for example, issuing an alarm, clearing encryption key(s), and/or initiating other anti-tampering measures as discussed above with regard to FIG. 1.

As was noted above with respect to the sticky bits, a dirty bit may be connected to the same power supply that is connected to the encryption key so that if a tamperer attempts to clear the dirty bit by removing its power, the tamperer might also clear the encryption key. In some embodiments, control block 110 decrements a sticky error counter when it encounters a set dirty bit at the beginning of the configuration stage. Such an embodiment is described in greater detail below with regard to FIG. 4. It is appreciated that the sticky error counter may similarly be implemented to increment rather than decrement without departing from the spirit of the embodiments herein.

Figure 3:
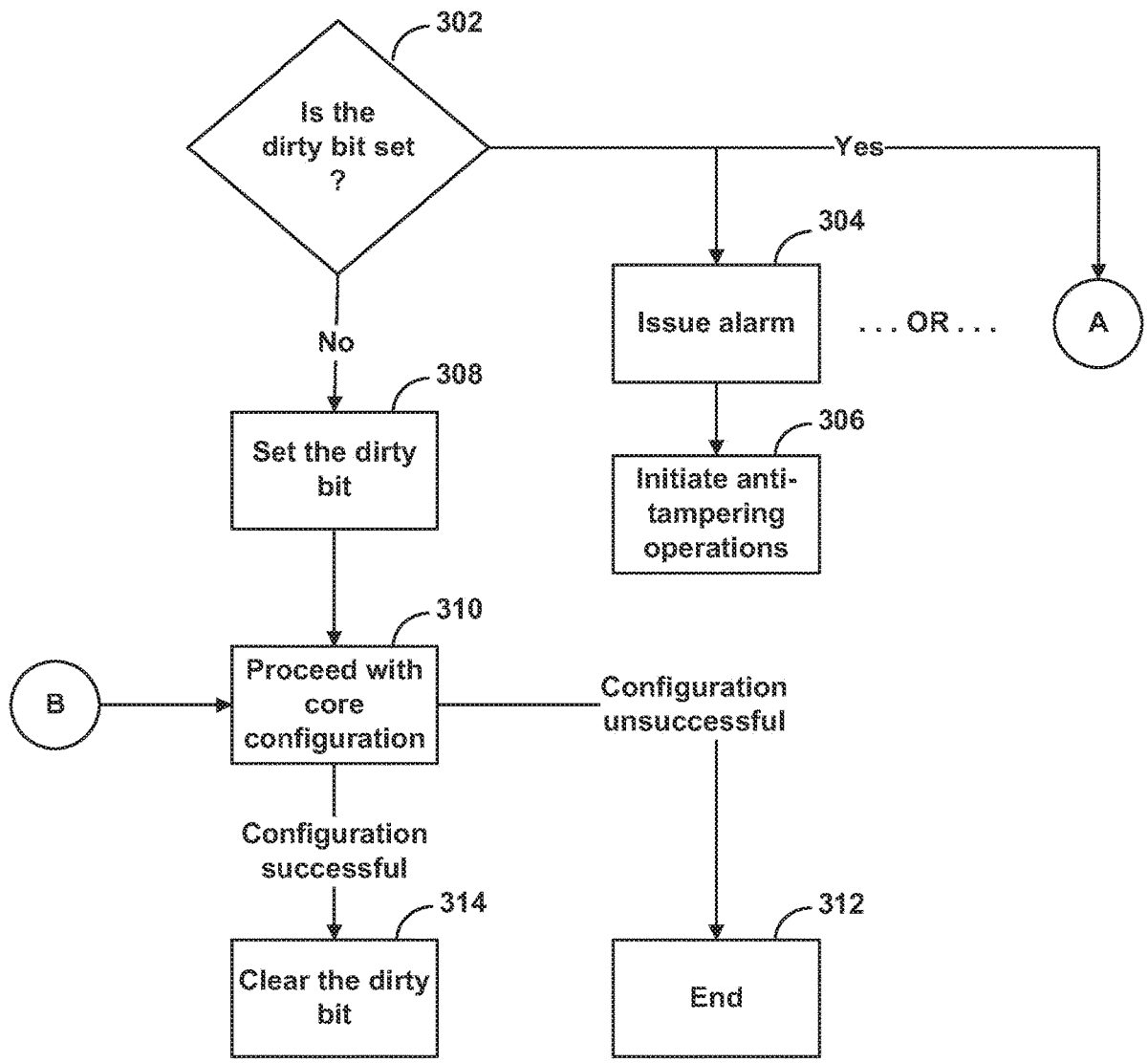
FIG. 3 is a flow chart of illustrative steps performed to determine whether a dirty bit is set at the beginning of a device's configuration stage, according to an illustrative embodiment.
Figure 4:
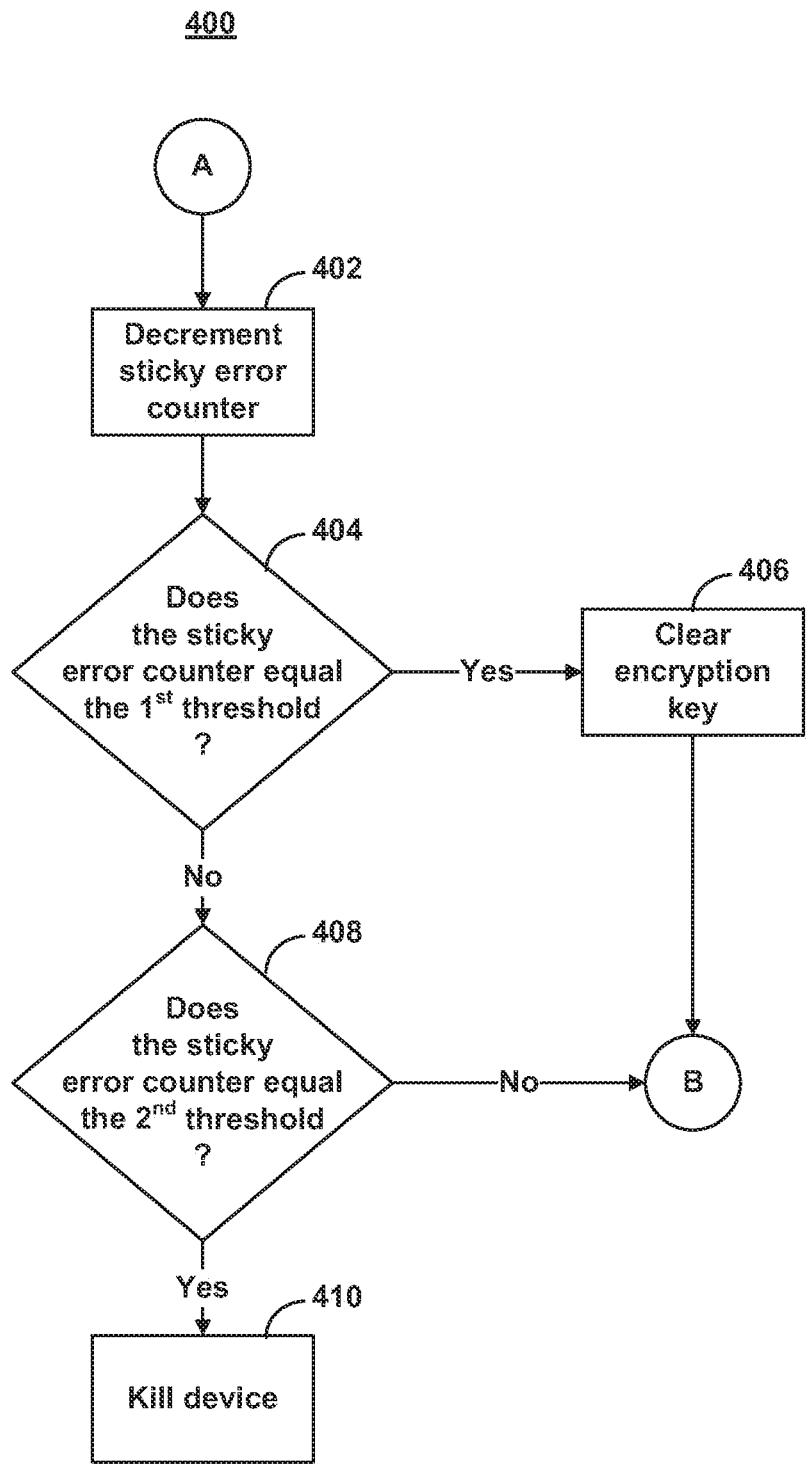
FIG. 4 is a flow chart of illustrative steps performed in association with a sticky error counter when a device configuration attempt fails, according to an illustrative embodiment.

FIG. 3 shows illustrative process 300 for determining whether a dirty bit is set at the beginning of the configuration stage of device 100 of FIG. 1. Process 300 generally commences when a configuration attempt is initiated. At step 302, it is determined whether the dirty bit is set. For example, control block 110 of FIG. 1 may determine the status of the dirty bit. If it is determined at step 302 that the dirty bit is set (e.g., indicating that someone might be tampering with device 100), process 300 proceeds to either step 304 or step A depending on the configuration of device 100. Optionally at step 304, an alarm is issued by device 100 that indicates that device 100 is being tampered with. In some embodiments, the alarm may be a visual or audible alarm that emanates from device 100 or other devices connected to device 100. In some embodiments, device 100 may transmit an alarm to a remote station to indicate to device 100's true owners that it is being tampered with. After, while, or instead of issuing the alarm at step 304, process 300 proceeds to step 306. Which actions are taken and the timing of those actions may be configured by the sticky bits. At step 306, anti-tampering operations are initiated that may include, for example, disabling device 100 or clearing an encryption key stored in registers 200 of FIG. 2. As noted above, further details regarding anti-tampering operations are discussed in copending, commonly-assigned U.S. patent application Ser. No. 13/097,816, issued as U.S. Pat. No. 8,461,863, which is hereby incorporated by reference herein in its entirety. At step A, process 400 of FIG. 4 is initiated to adjust a sticky error counter. Process 400 is described in greater detail below with regard to FIG. 4.

If the dirty bit is not set, process 300 proceeds to step 308 where the dirty bit is set. After setting the dirty bit, process 300 proceeds to step 310. At step 310, configuration of core 102 is attempted. As described above, this may include receiving POF 114 at control block 110 of FIG. 1 and using the configuration data in POF 114 to configure the logic circuitry of core 102.

If a nefarious user is attempting to tamper with device 100, process 300 will end at step 312 with an unsuccessful device configuration and restart at step 302 when the nefarious user attempts to configure device 100 again. For example, in the situation when a tamperer bombards device 100 with configuration attempts, as described above, the configuration of device 100 will be attempted and fail multiple times in an effort to determine the value of the encryption key. In such a situation, process 300 will proceed to either step 304 or step A, as described above, when the tamperer initiates another configuration attempt because the dirty bit was not cleared at step 312.

If the configuration attempt is successful at step 310, process 300 proceeds to step 314. At step 314, the dirty bit is cleared, which indicates that the configuration successfully completed. In some embodiments, the dirty bit may be cleared by a user's logic that has just completed configuration or other elements in core 102. In some embodiments, the dirty bit is cleared by control block 110 when, for example, the CRC check on the configuration data passes.

As noted above, in some embodiments, a sticky error counter may be used to keep track of the number of times configuration attempts have failed. Each time an encrypted POF fails to load properly (e.g., either because power is removed, the POF fails the CRC checks, or other configuration failure/interruption), the sticky error counter is adjusted (e.g., decremented or incremented). For example, as discussed above, one type of attack might include bombarding the device with false configuration information to attempt to determine the encryption key. Each time the false configuration information is received and/or fails to be processed, the sticky error counter is adjusted. The sticky error counter may be stored in any of the registers discussed above with regard to FIG. 2, for example, first group of volatile registers 202, which is powered by core 102's power supply, second group of volatile registers 204, which is battery-backed by battery 206, or nonvolatile registers 208, or any combination thereof.

In some embodiments, the sticky error counter may be stored redundantly just as the sticky bits may be, as described above. In some embodiments, the sticky error counter may be cleared in the same manner that the sticky bits are cleared, as described above (e.g., by removing power supplied to the volatile registers). In one embodiment, the sticky error counter is stored in the battery-backed registers of the second group of volatile registers 204, where the battery that backs up registers 204 also backs up a volatile encryption key such that removing the battery supply will clear the encryption key in addition to the sticky error counter.

In some embodiments, once the sticky error counter reaches a value of zero or some other predetermined threshold value, device 100 can initiate various anti-tampering operations, such as, issuing an alarm, clearing the encryption key, killing device 100, and/or any other suitable anti-tampering operation as described above. In some embodiments, multiple thresholds may be set so that different anti-tampering operations may be initiated at different times. For example, the sticky error counter may be initially set to a value of 10, with two thresholds set at a value of 5 and a value of 0, respectively. When the sticky error counter reaches the first threshold (e.g., a value of 5), control block 110 may initiate a first anti-tampering operation, such as, clearing the encryption key. When the sticky error counter reaches the second threshold (e.g., a value of 0), control block 110 may initiate a second anti-tampering operation, such as, killing device 100. In some embodiments, the sticky error counter may be incremented instead of decremented or may be manipulated using any other suitable mathematical function.

In some embodiments, a user may modify (e.g., reset or change) the value of the sticky error counter once the user enters the user mode stage. For example, the user may choose to reset the sticky error counter once successfully in the user mode stage.

Alternatively, the user may choose not to reset the sticky error counter to maintain a lifetime device configuration count. In some embodiments, a user may modify the values of the thresholds such that the alarms/anti-tampering operations are initiated at different sticky error counter values. In some embodiments, a user may preprogram the value of the sticky error counter into one of registers 200 via JTAG or core-logic.

FIG. 4 shows illustrative process 400 for adjusting a sticky error counter when a device configuration attempt fails. As noted above with regard to FIG. 3, process 300 may enter process 400 from step A to adjust the sticky error counter when it is determined at step 302 that the dirty bit is set at the beginning of the configuration stage. In some embodiments, process 400 may be entered when a failed configuration attempt is detected using any other suitable technique (e.g., a technique that does not utilize a dirty bit). At step 402, the sticky error counter is decremented. As noted above, the sticky error counter may be incremented instead of decremented without departing from the spirit of the embodiments herein. At step 404 it is determined whether the sticky error counter equals a first threshold, which may be substantially similar to the first threshold described above.

If the sticky error counter does equal the first threshold, process 400 proceeds to step 406 where a first anti-tampering operation is initiated. For illustrative purposes, step 406 depicts clearing the encryption key; however, any suitable anti-tampering operation may be initiated at step 406. After clearing the encryption key, process 400 may exit and return to process 300 via step B to continue with an attempt to configure the device. In some embodiments, device 100 halts and/or prevents further configuration processing and/or attempts after the sticky error counter reaches any of the thresholds instead of, for example, returning to process 300 via step B.

If the sticky error counter does not equal the first threshold at step 404, process 400 proceeds to step 408. At step 408, it is determined whether the sticky error counter equals a second threshold, which may be substantially similar to the second threshold described above. If the sticky error counter does not equal the second threshold, process 400 may exit and return to process 300 via step B to continue with an attempt to configure the device. If the sticky error counter does equal the second threshold, process 400 proceeds to step 410 where a second anti-tampering operation is initiated. For illustrative purposes, step 410 depicts killing the device; however, any suitable anti-tampering operation may be initiated at step 410. It should be noted that there may be any suitable number of thresholds where, when reached by the sticky error counter, various anti-tampering operation may be initiated. Two thresholds are depicted in process 400 for illustrative purposes and are not intended to be limiting.

In practice, one or more steps shown in process 300 or process 400 may be combined with other steps, preformed in any suitable order, performed in parallel (e.g., simultaneously or substantially simultaneously), or removed. For example, an alarm may issue at step 304 while process 400 is decrementing the sticky error counter. Process 300 and process 400 may be implemented using any suitable combination of hardware and/or software in any suitable fashion.

The above described embodiments of the present disclosure are presented for purposes of illustration and not of limitation, and the present disclosure is limited only by the claims which follow.

What is claimed is:

1. Control circuitry of a logic device configured to prevent tampering of programmable logic circuitry of a core of the logic device, wherein the control circuitry is configured to:
   receive configuration data configured to configure the programmable logic circuitry;
   determine that a configuration attempt of the programmable logic circuitry is valid based at least in part on an authentication bit asserting a first logical state, wherein the configuration attempt is associated with an unauthorized bitstream configured to program a second function of the programmable logic circuitry, and wherein the authentication bit is asserted before decryption of the unauthorized bitstream;
   adjust a counter value of a counter in response to the configuration attempt being invalid wherein the configuration attempt is determined to be invalid in response to the authentication bit asserting a second logical state different than the first logical state based on the configuration attempt failing to configure the programmable logic circuitry; and
   clear a configuration memory by zeroing an encryption key associated with decrypting the configuration data associated with the programmable logic circuitry in response to the counter reaching a threshold value, wherein clearing the configuration memory resets at least some of a plurality of logic array blocks and a plurality of logical connections of the programmable logic circuitry implementing a user design.

2. The control circuitry of claim 1, wherein the control circuitry is configured to adjust the counter value by decrementing the counter value in response to the configuration data being invalid.

3. The control circuitry of claim 1, wherein the encryption key is backed up by a battery of the logic device.

4. The control circuitry of claim 1, wherein the counter is backed up by a battery of the logic device.

5. The control circuitry of claim 1, wherein the control circuitry is configured to clear the configuration memory by zeroing the configuration data associated with the programmable logic circuitry.

6. The control circuitry of claim 1, wherein the control circuitry is configured to increment the counter based on a successful configuration of the programmable logic circuitry of the logic device.

7. A logic device configured to prevent tampering, comprising:
   programmable logic circuitry programmed to perform a first function, wherein the programmable logic circuitry comprises a configuration memory; and
   control circuitry coupled to the programmable logic circuitry, wherein the control circuitry is configured to:
      receive configuration data configured to configure the programmable logic circuitry;
      determine that a configuration attempt of the programmable logic circuitry is valid based at least in part on an authentication bit asserting a first logical state, wherein the configuration attempt is associated with an unauthorized bitstream configured to program a second function of the programmable logic circuitry, and wherein the authentication bit is asserted before decryption of the unauthorized bitstream;
      adjust a counter in response to the configuration attempt being invalid, wherein the configuration attempt is determined to be invalid in response to the authentication bit asserting a second logical state different than the first logical state based on the configuration attempt failing to configure the programmable logic circuitry; and
      clear the configuration memory by zeroing an encryption key associated with decrypting the configuration data associated with the programmable logic circuitry in response to the counter reaching a threshold value, wherein clearing the configuration memory resets at least some of a plurality of logic array blocks and a plurality of logical connections of the programmable logic circuitry implementing a user design.

8. The logic device of claim 7, wherein the control circuitry is configured to adjust the counter based on a successful configuration of the programmable logic circuitry.

9. The logic device of claim 8, wherein the control circuitry is configured to adjust the counter by incrementing the counter based on the successful configuration.

10. The logic device of claim 7, wherein the configuration memory is configured to store values configured to cause the programmable logic circuitry to be programmed to perform the first function.

11. The logic device of claim 10, wherein the counter is stored in a memory device and is backed up by a battery.

12. The logic device of claim 7, wherein the counter is configured to enable a user to set an initial value.

13. The logic device of claim 7, wherein the threshold value is zero.

14. The logic device of claim 7, wherein the control circuitry is configured to decrement the counter when adjusting the counter in response to determining that the configuration attempt is invalid.

15. The logic device of claim 7, comprising a memory device coupled to the control circuitry, wherein the memory device comprises a battery configured to back up at least a portion of the memory device, wherein the programmable logic circuitry comprises a plurality of logic array blocks, the plurality of logical connections, and the configuration memory, and wherein the programmable logic circuitry is configured to implement the user design of the plurality of the logic array blocks and the plurality of logical connections based on values stored in the configuration memory to program the programmable logic circuitry to perform the first function.

16. A method for preventing tampering of a logic device, comprising:
   receiving configuration data configured to configure programmable logic circuitry;
   determining, via control circuitry of the logic device, that a configuration attempt of programmable logic circuitry of a core of the logic device is valid based at least in part on an authentication bit asserting a first logical state, wherein the configuration attempt is associated with an unauthorized bitstream configured to program a different function of the programmable logic circuitry, and wherein the authentication bit is asserted before decryption of the unauthorized bitstream;

adjusting, via the control circuitry, a counter value of a counter in response to the configuration attempt being invalid, wherein the configuration attempt is determined to be invalid in response to the authentication bit asserting a second logical state different than the first logical state based on the configuration attempt failing to configure the programmable logic circuitry; and clearing, via the control circuitry, a configuration memory at least in part by zeroing an encryption key associated with decrypting the configuration data associated with the programmable logic circuitry in response to the counter reaching a threshold value, wherein clearing the configuration memory resets at least some of a plurality of logic array blocks and a plurality of logical connections of the programmable logic circuitry implementing a user design.

17. The method of claim 16, wherein adjusting, via the control circuitry, the counter value comprises decrementing the counter value.

18. The method of claim 16, comprising enabling an initial value of the counter value to be set by a user.

* * * * *